(12) United States Patent
Henri

(10) Patent No.: US 6,375,056 B1
(45) Date of Patent: Apr. 23, 2002

(54) OVER THE SHOULDER HOLSTER BELT

(76) Inventor: Jacques Henri, 2, rue des Sorbiers, St-Luc, Québec (CA), J2W 2X1

( * ) Notice: Subject to any disclaimer, the term of this patent is extended or adjusted under 35 U.S.C. 154(b) by 0 days.

(21) Appl. No.: 09/636,709

(22) Filed: Aug. 11, 2000

(51) Int. Cl.$^7$ .................................................. A45F 5/00
(52) U.S. Cl. ........................ 224/603; 224/623; 224/626; 224/250; 224/647
(58) Field of Search ................................. 224/194, 602, 224/603, 606, 623 B, 626, 627, 259, 262, 647, 250; 2/230, 307, 310, 327, 328, 340

(56) References Cited

U.S. PATENT DOCUMENTS

| | | | | |
|---|---|---|---|---|
| 366,475 A | * | 7/1887 | Gilmore | |
| 1,519,456 A | * | 12/1924 | Mouilbau | |
| 1,526,476 A | * | 2/1925 | Hodaly | |
| 4,756,458 A | * | 7/1988 | Clifton | |
| 4,888,830 A | * | 12/1989 | Putnam | |
| 4,949,888 A | * | 8/1990 | May | |
| 5,129,105 A | * | 7/1992 | Kleinman | |
| 5,172,429 A | * | 12/1992 | Lucier | |
| 5,746,365 A | * | 5/1998 | Scott | |
| 5,915,609 A | * | 6/1999 | Diakoulas | |

* cited by examiner

*Primary Examiner*—Gregory M. Vidovich
(74) *Attorney, Agent, or Firm*—Francois Martineau

(57) ABSTRACT

A holster belt for frictionally fitting over a shoulder and against the chest and back of an individual, said holster belt having: an elongated elastic band having releasable hooking first and second clamp buckles at its opposite ends for attachment to opposite sides of a wearer's waist belt, a generally open holster assembly, mounted at the end portion of said elastic band proximate said first clamp buckle for supporting and retaining a box-like article against the wearer's chest, said holster assembly formed by a belt loop of the holster belt; at least one elastic loop strip being transversely mounted to an intermediate section of said belt loop to accommodate and releasably retain against accidental release said box-like article.

3 Claims, 9 Drawing Sheets

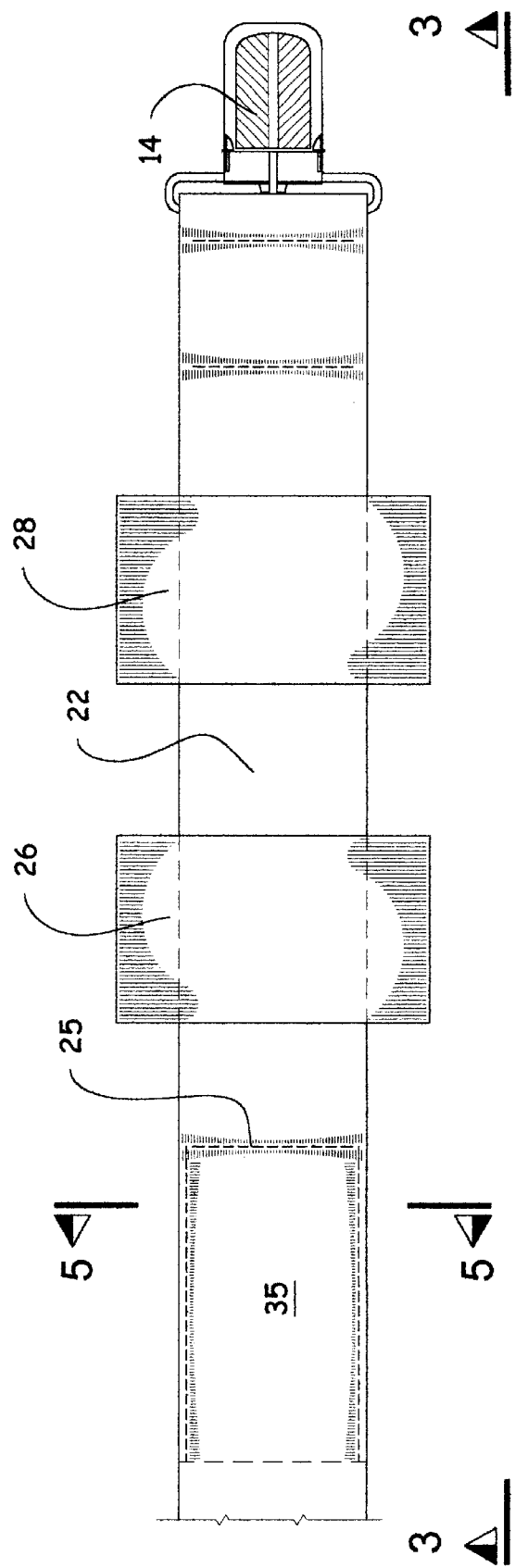
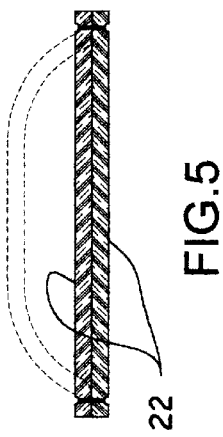
FIG.2
FIG.5

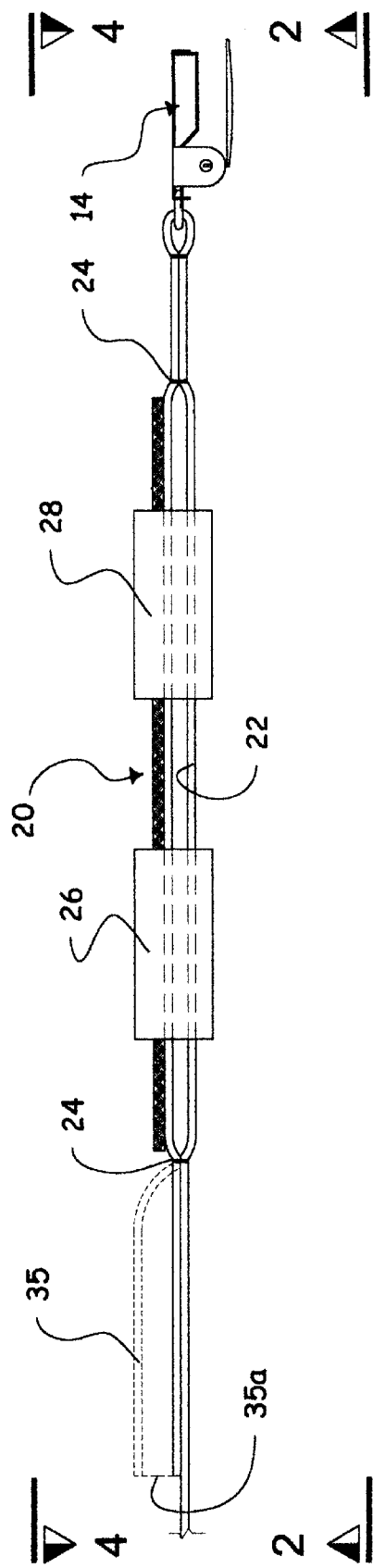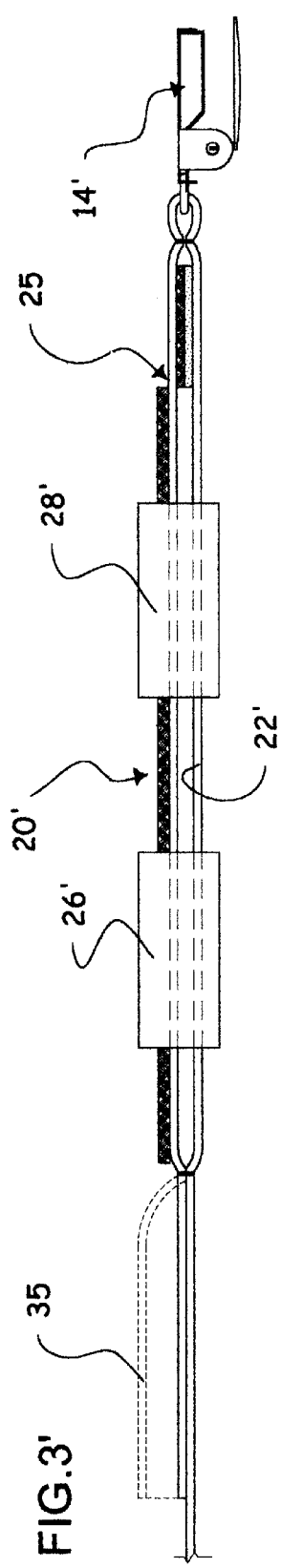
FIG.3
FIG.3'

OVER THE SHOULDER HOLSTER BELT

FIELD OF THE INVENTION

This invention relates to personal communication shoulder holsters that encircle the shoulder to support a small communication case.

BACKGROUND OF THE INVENTION

U.S. Pat. No. 5,358,159 issued in 1994 to Edgar LUNDIE, discloses a personal communication shoulder holster having a soft, flexible shoulder strap which encircles the shoulder with a size and shape to support side carriage of a small soft communication case under a user's arm. The should strap is adjustable in length and has resilient sections for adjustment and adaptability to body movement.

Such a shoulder holster as in the LUNDIE patent, is uncomfortable for the user during normal gait, where the user's arms will typically swing about back and forth, since the holster will come to chaff and eventually generate injuries to the user's inside arm.

U.S. Pat. No. 4,764,962 issued in 1988 to Joseph EKMAN et al, discloses a shoulder strap assembly having a pouch for supporting electronic audio equipment against the chest of a person. The shoulder strap assembly comprises a pair of suspenders comprised of a pair of straps which are adapted to extend over the shoulder. Each strap has a first hook and loop fastener part secured thereto and each electronic audio equipment has a second hook and loop fastener part attached to the rear face thereof, wherein the two hook and loop fastener parts are removably coupled together to interconnect the electronic audio equipment to the strap.

However, in the EKMAN patent, the electronic equipment holster or pouch can fit only against the front chest or back of the wearer, not on the lateral side thereof. This makes the electronic equipment quite conspicuous, which may not be appropriate in a number of social environments.

OBJECTS OF THE INVENTION

A goal of the present invention is to provide a holster belt which will readily adapt to all sizes of cell phones.

Another object of the present invention is that the holster belt have a smooth outer surface, so as to be unobstrusive to the user.

A further object of the invention is that the holster assembly of the holster belt be positioned in such a position as not to affect in any way usual arm movements of the user, in particular during normal gait.

Another object of the invention is that the holster belt assembly be positioned in such a fashion as to enable the user's arm and chest to act as shields for protecting the cell phone or other article inside the holster assembly from external borne damage.

A further object of the invention is to make inconspicuous the cell phone inside the holster belt, when the user wears a jacket over the holster belt, so as to provide a suitable clothing attire which would be acceptable by peers for a variety of social environments.

An object of the invention is to allow the cell phone user to hear (or feel from vibration) an incoming call phone ring, wherein the holster assembly will not significantly dampen the sound generated by the phone.

SUMMARY OF THE INVENTION

In accordance with the teachings of the invention, there is disclosed a holster belt for frictionally fitting over a shoulder and against the chest and back of an individual, said holster belt having: an elongated elastic band having releasable hooking first and second clamp buckles at its opposite ends for attachment to opposite sides of a wearer's waist belt, a generally open holster assembly, mounted at the end portion of said elastic band proximate said first clamp buckle, for supporting and retaining a box-like article against the individual's chest, said holster assembly formed by a belt loop of the holster belt; and preferably at least one elastic loop strip (and most preferably two) being transversely mounted to an intermediate section of said belt loop to accommodate and releasably retain against accidental release said box-like article; wherein said holster assembly will be generally concealed from view, will clear the arm during normal gait and will be shielded from external borne damage wherein said holster assembly will be generally concealed from view, will clear the arm during normal gait and will be shielded from external borne damage by the wearer's body.

Preferably, a length adjustment loop assembly is formed at an end portion of said elastic band proximate said second clamp buckle, for adjusting the length of said holster belt to fit individuals of various sizes. Preferably also, a stitching network is applied onto said belt loop of the holster assembly to permanently fix the length thereof.

It is envisioned to add an adjustment member, applied onto said belt loop of the holster assembly for adjusting the length of said belt loop.

A second said holster belt could be added, for frictionally fitting over the other shoulder of this person, wherein said length adjustment loop assembly of said second holster belt engages through the loop of said length adjustment loop assembly of the first mentioned holster belt for fitting against the wearer's back.

In accordance with an alternate embodiment of the invention, there is disclosed a holster belt assembly for frictionally fitting over a shoulder and against the chest and back of an individual, said holster belt assembly having: a first elongated elastic band, having inner and outer ends, said outer end having a releasable hooking clamp buckle for attachment to one lateral side portion of the front section of a wearer's waist line belt, a second elongated elastic band, having inner and outer ends, said second band outer end having a releasable hooking clamp buckle for attachment to a lateral side portion of the front section of the wearer's waist line belt opposite said one lateral side portion of said first band, a generally open holster pocket member, mounted onto at least one of said first and second elastic bands intermediately of said inner and outer ends of the corresponding elastic band proximate the outer end thereof; a third elongated elastic band, having inner and outer ends, said third band outer end having a releasable hook clamp buckle for attachment to an intermediate rear portion of the wearer's waist line belt; and a semi-rigid polygonal bus, fixedly interconnecting said inner ends of the first to third elastic bands so that said first to third elastic bands form a Y-shape in planar disposition, wherein said polygonal bus provides an automatic dynamic tension adjustment of the load generated by the three said elastic bands when said first and second elastic bands are stretched over the wearer's shoulders, so that a steady state tension equilibrium is achieved.

BRIEF DESCRIPTION OF THE DRAWINGS

FIG. 2 is an enlarged top plan view of the holster portion of the holster belt of FIGS. 1a–1b;

FIG. 3 is an edge view of one end portion of the holster belt taken from perspective 3—3 off FIG. 2;

FIG. 3' is an edge view of an alternate embodiment of holster belt assembly portion of the holster belt;

FIG. 5 is a cross-sectional view at an enlarged scale of the holster belt taken along line 5—5 of FIG. 2;

DETAILED DESCRIPTION OF THE PREFERRED EMBODIMENTS OF THE INVENTION

Figure 1A:
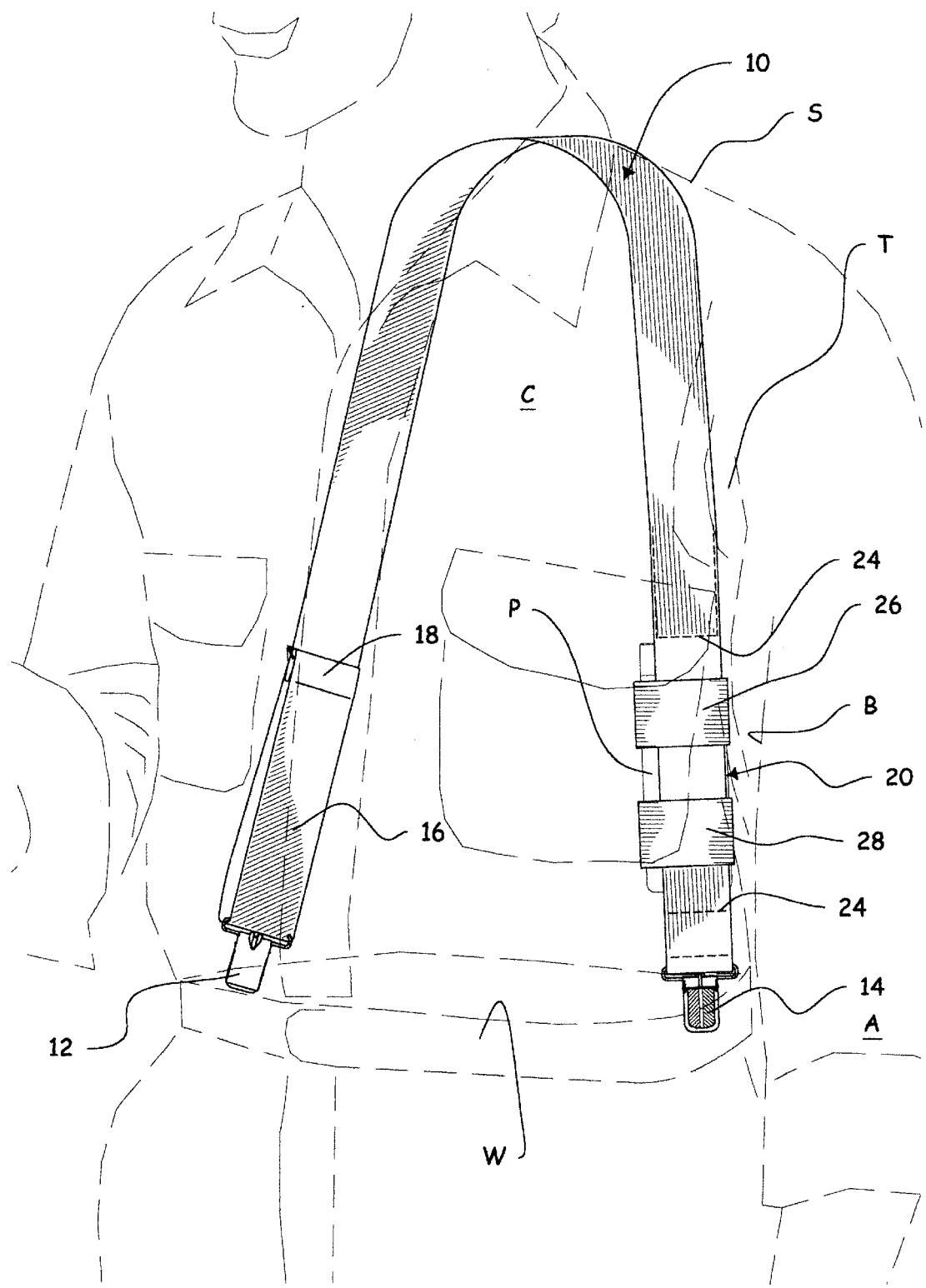
FIG. 1a is a front see-through elevational view of a person shown in phantom lines, to the pants waist belt of which the holster belt according to the invention is attached.
Figure 1B:
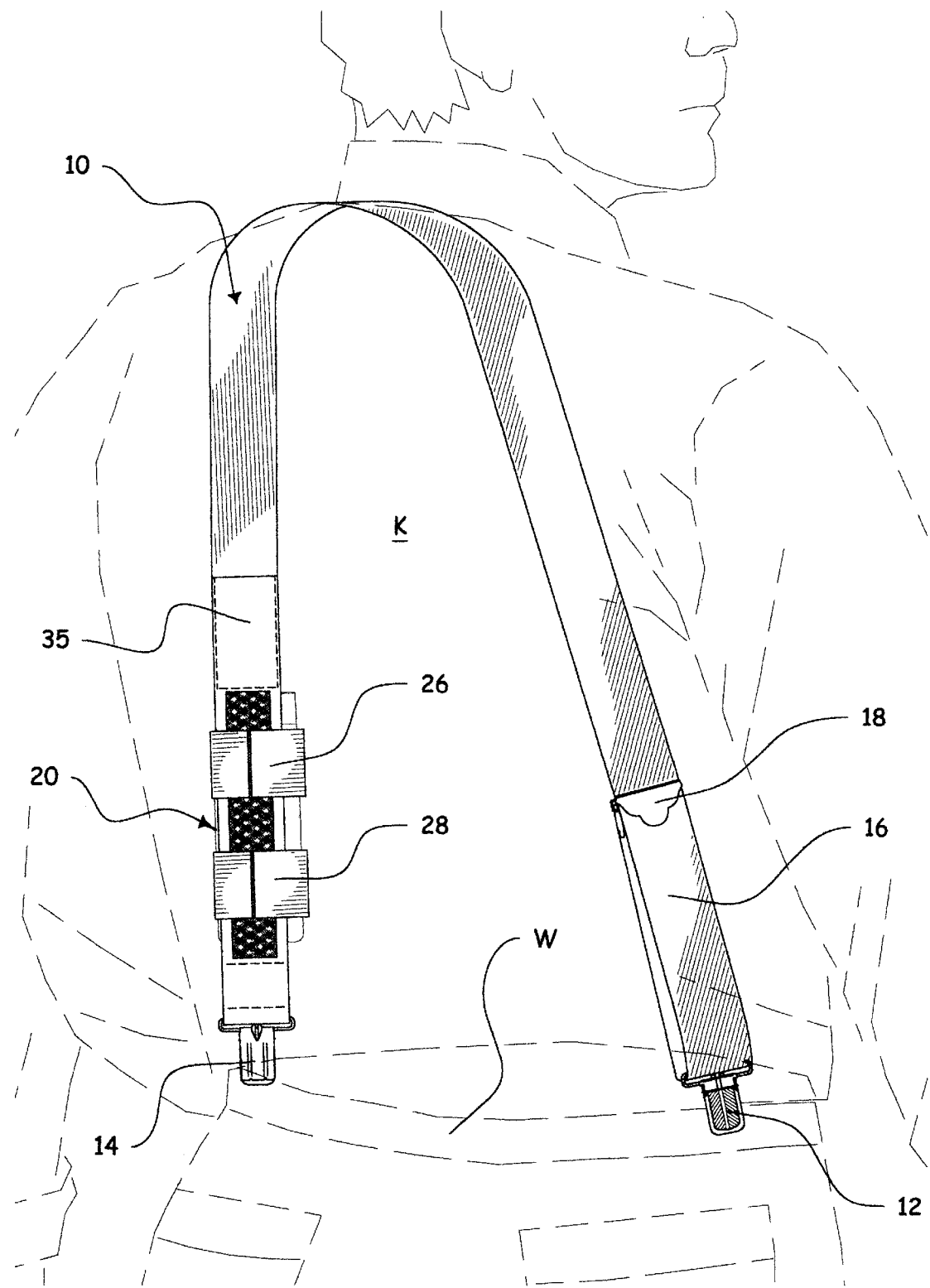
FIG. 1b is a rear see-through elevational view of the person and holster belt of FIG. 1.

The invention consists of an elongated elastic band 10 having releasable hooking clamp buckles 12, 14, at its opposite ends. Elastic band 10 includes at its end portion proximate hooking clamp 12 a length adjustment loop 16, formed by an intermediate bracket 18 in the known fashion. Loop 16 is of variable length, depending on the size of the individual user chest C. Elastic band 10 also includes at its end portion proximate hooking clamp 14 (for example at about 2.5 cm therefrom) a holster assembly 20, for supporting and retaining an article such as a cell phone P, a cigar pack, or the like. Holster assembly 20 is formed by another belt loop 22 of the holster belt, with loop 22 being of permanently fixed length whereby permanent attachment means such as stitch lines 24 (see FIG. 3), are used to maintain constant this length of belt loop 22. Alternately, the length of the belt loop 22 is variable, with the stitch lines 24 being replaced by a hook and loop fastening adjusters 25 (see FIG. 3'). For example, the length of belt loop 22 may be about 9 cm. Furthermore, a pair of elastic loop strips 26, 28, are transversely mounted to an intermediate section of belt loop 22, to accommodate and retain against accidental release the cell phone P, cigar pack or the like article. Each elastic strip 26, 28, may have an unstretched length of for example about 4 cm in width and about 16 cm in overall looping length. The open holster assembly 20 has apertures enabling for example escape of the cell phone antenna without damage thereto, when the holster belt 10 is worn against the user's chest C. For access to the cell phone P inside the holster 20, the user needs to release the two elastic strips 26, 28, from band section 22.

Clamps 12, 14, preferably attach to the upper fabric rim of the pant, and not to the waist belt per se.

Figure 4:
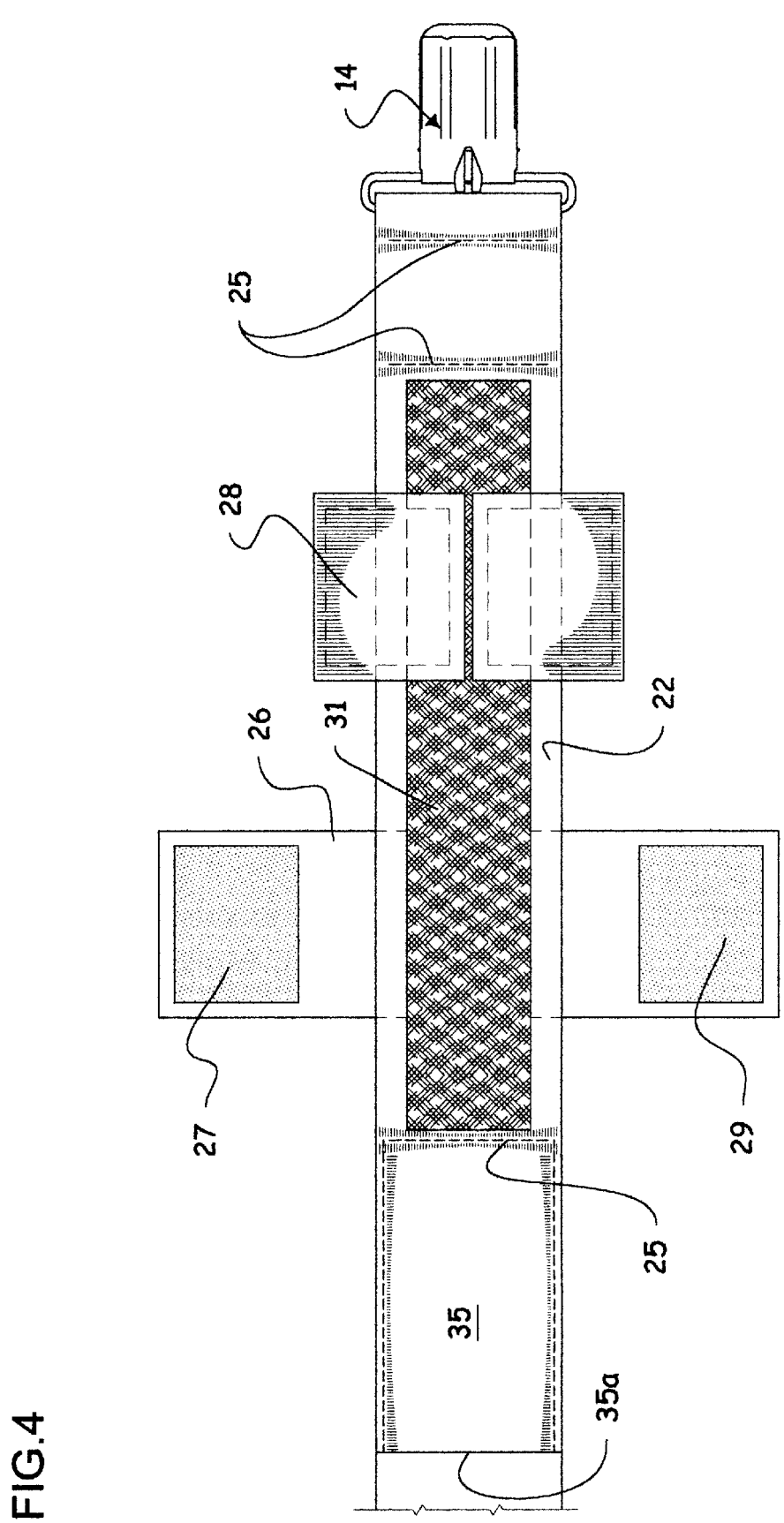
FIG. 4 is a bottom plan view of the holster portion shown in FIG. 2.
Figure 6:
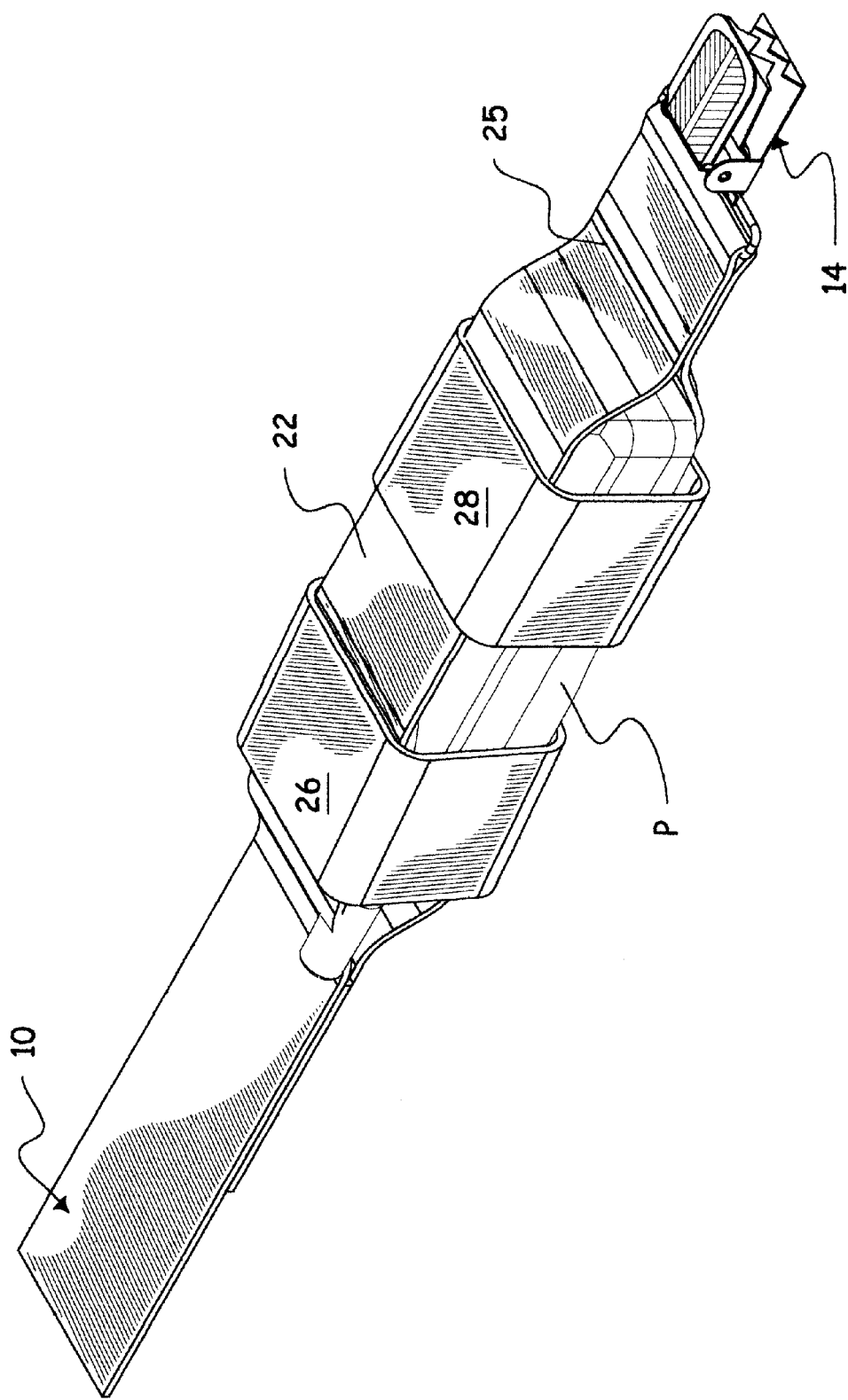
FIGS. 6 and 7 are upper and lower perspective views respectively of the holster belt portion and of a cell phone secured within the holster.

As illustrated in FIG. 4 of the drawings, each transverse strip 26, 28, includes a pair of opposite loop pads 27, 29, on the inner face thereof, and the bottom face of band loop 22 includes a full length hook pad 31, wherein the loop pads 27, 29, are detachably connectable to a registering section of complementary hook pad 31 around the cell phone P.

Figure 7:
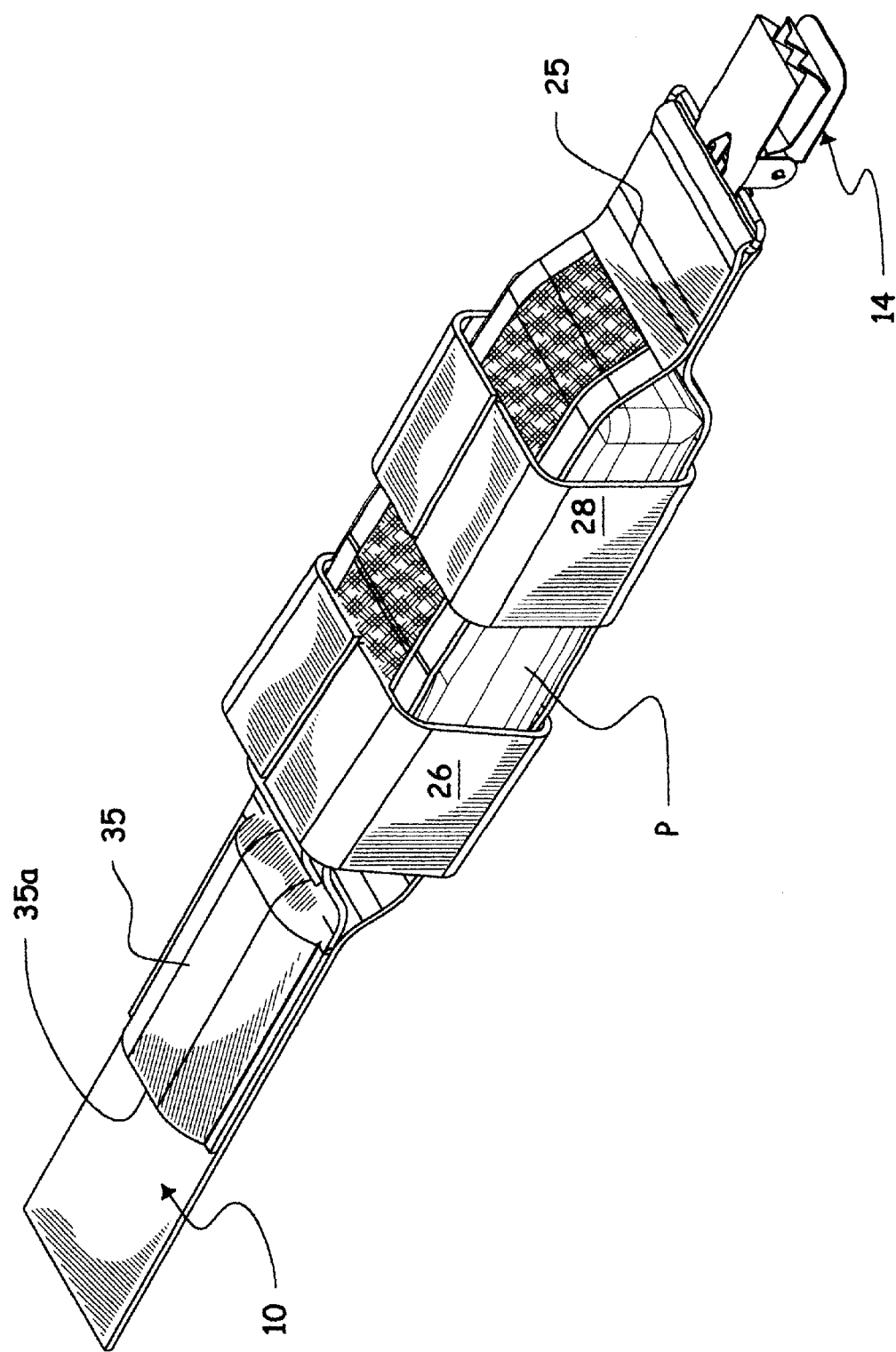

Preferably, a generally closed pocket 35 (FIG. 7) is integrally mounted (e.g. by stitching) to band 10, proximate holster assembly 20 on the side thereof opposite clamp 14. This pocket 35 is formed from a non elastic rectangular sheet stitched along three of its four sides to band 10, so as to define an upper mouth 35a. Pocket 35 may receive for example through mouth 35a a manual cigar cutter, or a headphone set for cellphones.

This open pocket formed by the holster assembly 20 should be positioned through selective attachment of the holster belt end clamps 12, 14, onto the user's waist belt line W, so that the holster assembly 20 be located in close proximity to the biceps arm muscle B of the user but spacedly therefrom, above the chest C so as to clear the user's arm A beneath the armpit T. In this way, this holster belt 10 will not be able to accidentally shift on the user's shoulder S, but will remain tautly in place during normal gait of that individual. Also, arm swinging motion during normal gait of the wearer will not bring arm A to undesirably strike the cellphone inside the holster. Furthermore, the user may easily remove the cell phone P from the open holster assembly 20 of the present holster belt 10, or alternately insert the cell phone P therein, without ever having to release the holster belt 10 from the user's waist band W, simply by removing the upper transverse loop band 26. Since this open pocket 20 is formed by a loop of two overlapping holster belt portions 22, 22, which are therefore parallel to one another, and from two transversely extending looping elastic strips 26, 28, this open pocket 20 may accommodate cell phones P or cigar packs G of variable sizes and shapes, since this open pocket 20 may stretch to conform to the thus contained article. The transverse strips 26, 28, may slide along the holster pocket 20, accordingly with the format and size of the box like article to secure therein, so as to provide perfect attachment inside the holster pocket.

The holster belt 10 therefore provides an ergonomically efficient tool to carry cell phones P or the like articles, without concern for damages from accidental release while enabling easy access to and release from the holster pocket 20.

FIG. 3' teaches an alternate embodiment of the invention, where similar reference numerals are primed. In FIG. 3', the length of the holster pocket loop 20' can be adjusted with a hook and loop (VELCRO—TM) fastener assembly 25. This elastic holster belt 10' may have for example an unstretched width of about 4 centimeters (cm) and a length of about 13 cm.

Figure 8:
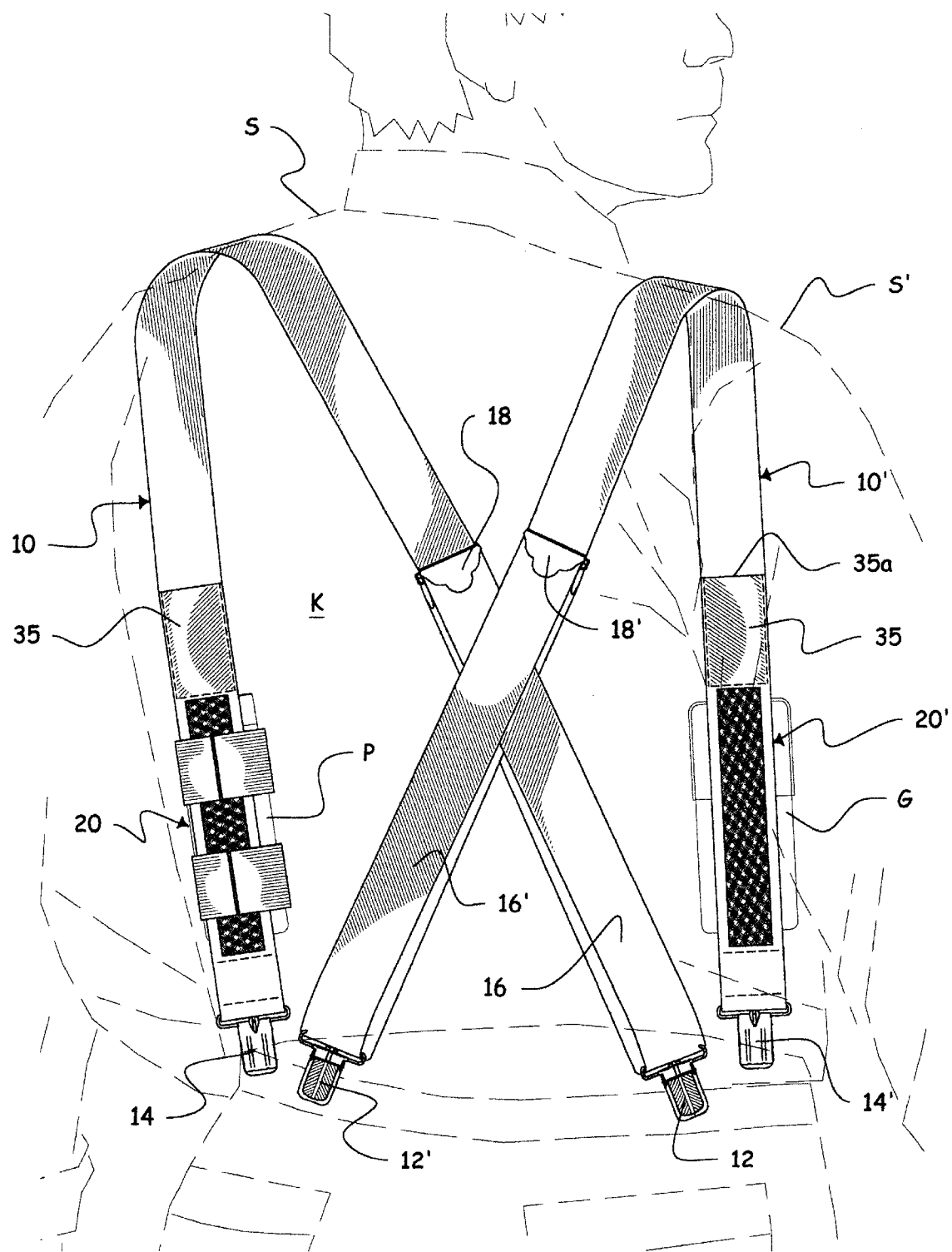
FIG. 8 is a rear see-through elevational view of a person with a pair of holster belts according to the invention attached to that person's pants waist belt.

FIG. 8 shows that a pair of holster belts 10, 10', according to the invention can be used concurrently over the shoulders of an individual user. One holster belt 10 straddles a first shoulder S of the wearer, and can be used to support a cell phone P in the holster 20, while the other holster belt 10' straddles the second shoulder S' of this person and can be used to support a cigar pack G in its respective holster portion 20'. Each holster belt 10, 10', is attached at one end to the lateral side of the rear portion of the person's waist belt W on opposite lateral sides of the waist belt front portion, while the opposite ends of the holster belts 10, 10', are attached to the transversely opposite lateral side of the front portion of the waist belt W on opposite sides of the waist belt front portion. One of this pair of holster belts, 10, engages through the length adjustment loop 16 of the other one of these holster belts, 10', this belt loop 16 being located at the back K of the individual user, as illustrated in FIG. 8, so that a cross-shape belt arrangement is achieved. Such a dual holster belt arrangement 10, 10', as shown in FIG. 8, can also concurrently be used as a pant supporting belt assembly, thus doing away with the convention pant support belt assembly.

Figure 9:
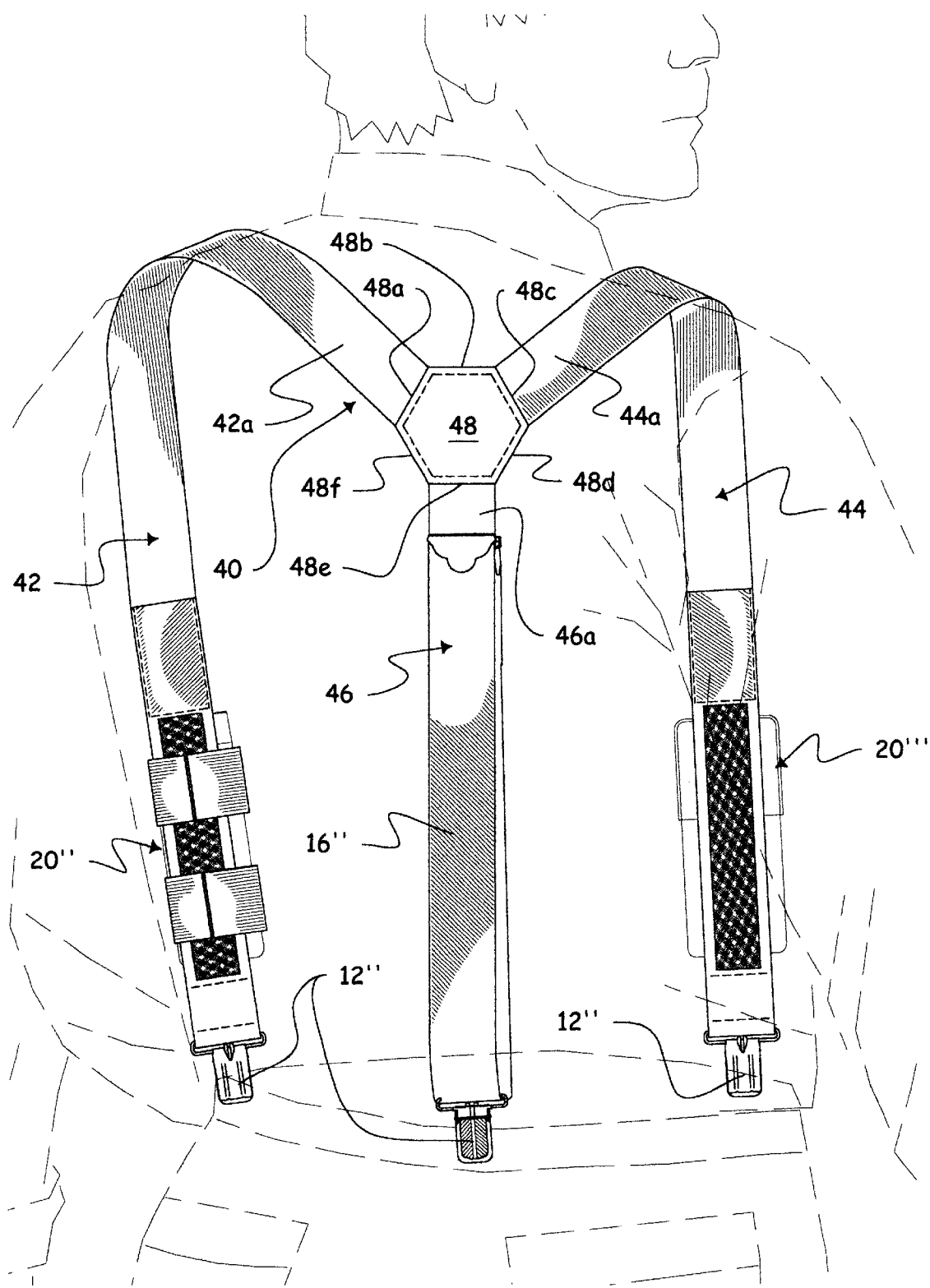
FIG. 9 is a view similar to FIG. 8, but showing an alternate embodiment of holster belt assembly made from three separate elastic bands joining with a hexagonal bus pad.

In the embodiment of FIG. 9, corresponding elements are double primed. The shoulder belt assembly 40 includes three separate elastic band segments 42, 44, 46, interconnected to each other at their inner ends 42a, 44a, 46a, by an hexagonal semi-rigid bus member 48. More particularly, band ends 42a, 44a, are stitched to two non consecutive side edges 48a, 48c, respectively of hexagonal bus 48; and band end 46a is stitched to side edges 48c of bus 48; wherein free side edges 48b, 48d, 48f, provide free spacing between non consecutive bus side edges 48a, 48c, 48e. The outer ends of elastic bands 42, 44, 46, each carry a holding clamp 12", for attachment to the top edge of a wearer's pant. Rear band 46 carries a length adjustment loop assembly 16", while front bands 42, 44, each carry a holster assembly 20", 20"'. Preferably, bus 48 is made from supple leather. All three bands 42–46 should extend generally upright, as illustrated in FIG. 9, when attached to the pants with their lower holding clamps 12'. Front bands 42, 44, extend over opposite shoulders of the wearer.

In use, the leather bus 48 of FIG. 9 provides an automatic dynamic adjustment of the load generated by the three stretched hands 42–46, due to the bus hexagonal shape, so that a steady state tension equilibrium is achieved. Accordingly, the cell phone or the like mounted inside the holster assemblies 20", 20"', will always remain frictionally applied against the side of the wearer's chest, reducing to the absolute minimum the likelihood that the cell phone, cigar pack or the like will accidentally escape from the holster assemblies.

I claim:

1. A holster belt assembly for frictionally fitting over a shoulder and against the chest and back of an individual, said holster belt assembly having:

a first elongated elastic band, having inner and outer ends, said outer end having a releasable hooking clamp buckle for attachment to one lateral side portion of the front section of a wearer's waist line belt, a second elongated elastic band, having inner and outer ends, said second band outer end having a releasable hooking clamp buckle for attachment to a lateral side portion of the front section of the wearer's waist line belt opposite said one lateral side portion said first band, a generally open holster pocket member, mounted onto said first elastic band intermediately of said inner and outer ends thereof, said pocket member comprising:
   a) a short elastic strip portion, said strip portion extending over a fraction of said the length of first elastic band and having first and second opposite end portions, the latter said first and second opposite end portions each anchored to said first elastic band by stitch lines, said elastic strip portion and said first elastic band each defining an external wall, an inner pocket enclosure formed between said elastic strip portion internal wall and said first elastic band internal wall, wherien a package can be releasably inserted into said inner pocket enclosure; and
   b) a pair of loop memers, each said loop member extending freely transversely of said elastic strip portion spacedly from one another and surroundingly engaging said external wall of said elastic strip and said external wal of said first elastic band, wherein said loop member provide containment of a package inserted into said inner pocket enclosure against accidental release therefrom, a third elongated elastic band, having inner and outer ends, said third band outer end having a releasable hook clamp buckle for attachment to an intermediate rear portion of the wearer's waist line belt; and a semi-rigid polygonal bus, fixedly interconnecting said inner ends of the first to third elastic bands so that said first to third elastic bands form a Y-shape in planar disposition wherein said polygonal bus provides an automatic dynamic tension adjustment of the load generated by the three said elastic bands when said first and second elastic bands are stretched over the wearer's shoulders, so that a steady state tension equilibrium is achieved.

2. A holster belt assembly as in claim 1, wherein each of said loop members consists of an elongated flexible member having a hook fastener at opposite ends thereof for engagement with a loop fastener on the external wall of said first elastic band, wherein said flexible member is releasably closed by inter-engagement of said hook fastener and said loop fastener.

3. A holster belt assembly as in 2, wherein said flexible member is made from an elastic material, so that said pocket member inner pocket enclosure be adjustable in size and shape to be able to provide containment and accommodation for loads of variable size and shape.

\* \* \* \* \*